US011991346B2

(12) United States Patent
Lei et al.

(10) Patent No.: US 11,991,346 B2
(45) Date of Patent: May 21, 2024

(54) VIDEO STREAMING ANOMALY DETECTION

(71) Applicant: FORD GLOBAL TECHNOLOGIES, LLC, Dearborn, MI (US)

(72) Inventors: Oliver Lei, Windsor (CA); Vladyslav Slyusar, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 17/526,473

(22) Filed: Nov. 15, 2021

(65) Prior Publication Data

US 2023/0156179 A1    May 18, 2023

(51) Int. Cl.
*H04N 17/00* (2006.01)
*G05D 1/00* (2006.01)
*H04L 43/045* (2022.01)
*H04L 65/80* (2022.01)
*H04N 7/18* (2006.01)

(52) U.S. Cl.
CPC ........... *H04N 17/00* (2013.01); *G05D 1/0038* (2013.01); *H04L 43/045* (2013.01); *H04L 65/80* (2013.01); *H04N 7/181* (2013.01); *B60R 2300/20* (2013.01)

(58) Field of Classification Search
CPC ...... H04N 17/00; H04N 7/181; G05D 1/0038; H04L 43/045; H04L 65/80; B60R 2300/20

USPC ................................................. 348/148, 149
See application file for complete search history.

(56) References Cited

U.S. PATENT DOCUMENTS

| 4,855,822 | A | 8/1989 | Narendra et al. |
| 7,620,483 | B2 | 11/2009 | Florentin et al. |
| 8,347,344 | B2 | 1/2013 | Makhija et al. |
| 2019/0339689 | A1* | 11/2019 | Ryan ........................ H04W 4/38 |
| 2021/0326381 | A1* | 10/2021 | Janakiraman ....... G06F 16/7867 |

FOREIGN PATENT DOCUMENTS

| CN | 102067495 | A | * | 5/2011 | ........... H04L 1/0002 |
| CN | 103793926 | A | * | 5/2014 | |
| CN | 111510735 | A | | 8/2020 | |
| WO | WO-9963698 | A2 | * | 12/1999 | ......... H04L 12/2803 |

* cited by examiner

*Primary Examiner* — Zi Ye
*Assistant Examiner* — Mariegeorges A Henry
(74) *Attorney, Agent, or Firm* — Joseph Zane; Brooks Kushman P.C.

(57) ABSTRACT

Monitoring of a vehicle is provided. A plurality of video feeds captured from cameras of the vehicle are received, over a network from a vehicle, each of the plurality of video feeds including a plurality frames, each of the frames of each of the video feeds being assigned a sequence number that increases for each successive frame. The sequence numbers are analyzed to identify missing frames, delayed frames, or stale frames. The plurality of video feeds is displayed, to one or more monitors, the sequence numbers corresponding to the displayed frames, and for each of the plurality of video feeds, indications of whether any missed frames, delayed frames, or stale frames were identified.

16 Claims, 7 Drawing Sheets

VIDEO STREAMING ANOMALY DETECTION

TECHNICAL FIELD

Aspects of the disclosure relate to anomaly detection for video streaming applications, such as, for example for use in remote driving situations.

BACKGROUND

A vehicle may include one or more cameras. These may include a rear-facing camera useful for allowing a driver to see behind the vehicle, and a front-facing camera useful for allowing a driver to see objects immediately in front of the vehicle.

SUMMARY

In one or more illustrative examples, a system for monitoring a vehicle includes a monitoring system having one or more monitors. The monitoring system is configured to communicate with a vehicle over a network and programmed to receive a plurality of video feeds captured from cameras of the vehicle. Each of the plurality of video feeds includes a plurality frames, and each of the frames of each of the video feeds is assigned a sequence number that increases for each successive frame. The monitoring system is configured to analyze the sequence numbers to identify missing frames, delayed frames, or stale frames, and display, to the one or more monitors, the plurality of video feeds, the sequence numbers corresponding to the displayed frames, and for each of the plurality of video feeds, indications of whether any missed frames, delayed frames, or stale frames were identified.

In one or more illustrative examples, a method for monitoring a vehicle is provided. A plurality of video feeds captured from cameras of the vehicle are received, over a network from a vehicle, each of the plurality of video feeds including a plurality frames, each of the frames of each of the video feeds being assigned a sequence number that increases for each successive frame. The sequence numbers are analyzed to identify missing frames, delayed frames, or stale frames. The plurality of video feeds is displayed, to one or more monitors, the sequence numbers corresponding to the displayed frames, and for each of the plurality of video feeds, indications of whether any missed frames, delayed frames, or stale frames were identified.

In one or more illustrative examples, a non-transitory computer-readable medium includes instructions that, when executed by one or more processors of a monitoring system, cause the monitoring system to perform operations including to receive, over a network from a vehicle, a plurality of video feeds captured from cameras of the vehicle, each of the plurality of video feeds including a plurality frames, each of the frames of each of the video feeds being assigned a sequence number that increases for each successive frame; analyze the sequence numbers to identify missing frames, delayed frames, or stale frames; display, to one or more monitors for use by an operator of the monitoring system, the plurality of video feeds, the sequence numbers corresponding to the displayed frames, and for each of the plurality of video feeds, indications of whether any missed frames, delayed frames, or stale frames were identified, wherein a stale frame is a frame with a lower frame number than another previously received frame for the same video feed; receive remote driving commands from an operator of the monitoring system; and send the remote driving commands from the monitoring system to the vehicle.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In remote driving systems, a vehicle may send one or more video feeds to a monitoring system and may receive commands from the monitoring system. Remote driving or direct teleoperated driving requires network latency, throughput bandwidth and channel quality to ensure the video is streaming to remote driver smoothly. This allows for the vehicle to be driven within predefined parameters. Network anomalies may occur, such as network jitter, sudden long latency, fluctuating bandwidth, packet loss, frame loss, etc. As a result, the video viewed by the remote driver may not represent the real-time vehicle environment. The anomalies may result in a large offset of the location in the video. This offset may result in poor remote driving performance. In some instances, the remote driver may be unaware of the anomalies.

An improved approach to detect missing or delayed video frames or abnormal time delta (e.g., stale) images may be performed by assigning a sequence number for each frame and measuring round-trip-time between vehicle modem and remote station. Such a system may allow for the detection of network anomalies such as missing frames, delayed frames, or stale frames in the video feed. A remote driver may be alerted with network anomalies and may take action accordingly. Further aspects of the disclosure are discussed in detail herein.

Figure 1:
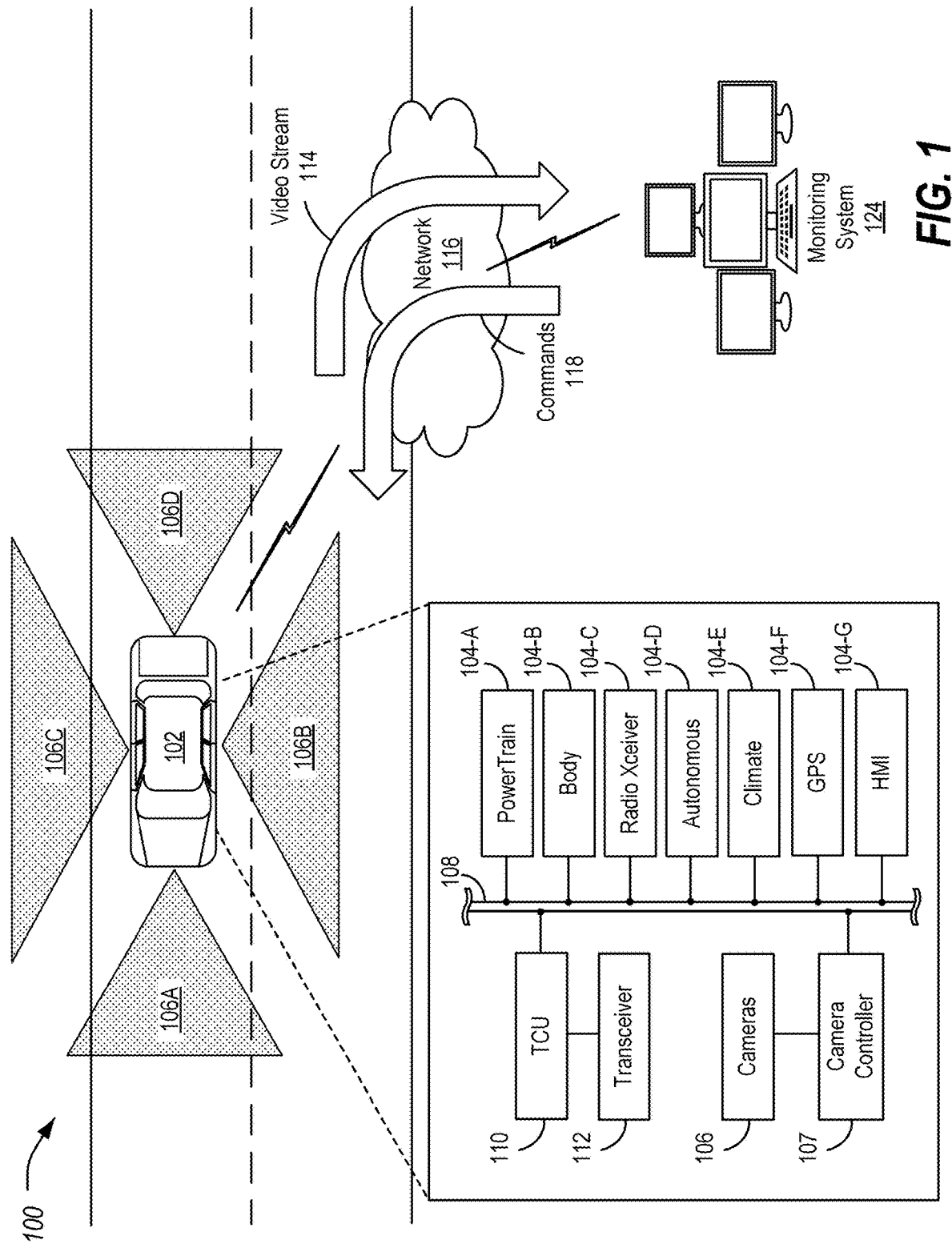
FIG. 1 illustrates an example system for performing video streaming anomaly detection for improved remote driving.

FIG. 1 illustrates an example system 100 for performing video streaming anomaly detection for improved remote driving. A vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a HMI controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors to receive information with respect to the surroundings of the vehicle 102. In an example, these sensors may include one or more of cameras 106 configured to capture frames of video of the surroundings of the vehicle 102. As shown, an example vehicle 102 may include four cameras: a front-facing camera 106A, a left-facing camera 106B, a rear-facing camera 106C, and a right-facing camera 106D.

The cameras 106 may be connected to and controlled by a camera controller 107. The camera controller 107 may be configured to handle various aspects of the management of the frames of video from the cameras 106. In an example, the camera controller 107 may assign each camera frame to a consecutive sequence. At any time, the frame sequence numbers among the cameras 106 are intended to be the same. For example, when the cameras 106 are activated, the first frame sequence number may be set to an arbitrary value, such as 100. Then, the next frame sequence number from the cameras 106 may be assigned to the next frame number, e.g., 101. The camera controller 107 may also be configured to have a function to reset all frame sequence numbers to a same sequence number for synchronization purposes. The function may also abandon any frames currently being buffered for the cameras 106 as part of the synchronization action.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a cellular transceiver 112 configured to facilitate communication with other vehicles 102 or with infrastructure. The TCU 110 may, accordingly, be configured to communicate over various protocols, such as with a communication network 116 over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 110 may be configured to send a video stream 114 from the vehicle 102 over the network 116 to a monitoring system 124. The video stream 114 may include feeds of frames of images from the cameras 106. The video stream 114 may also include metadata with respect to the images, such as the sequence numbers of the frames and/or frames per second of the video stream 114.

The TCU 110 may also be configured to receive commands 118 from the monitoring system 124. For example, the commands 118 may include a command to begin receiving the video stream 114, a command to discontinue receiving the video stream 114, a command to resynchronize the cameras 106 of video stream 114, etc. The TCU 110 may also be configured to receive remote commands 118 and provide those commands to the vehicle controllers 104 to allow the vehicle 102 to be controlled. For instance, a remote driver may be operating the monitoring system 124 by viewing the video stream 114 as displayed to the monitoring system 124. Based on the viewing, the remote driver may provide remote commands 118 such as steering inputs, acceleration inputs, braking inputs, etc., to the monitoring system 124 to be sent to and received by the vehicle 102 for implementation by the vehicle controllers 104. In some examples, the remote driver is an autonomous driving algorithm, while in other examples, the remote driver may include a human operator.

When the video stream 114 is activated, the monitoring system 124 may be configured to display the video stream 114 on one or more monitors. In one example, each camera 106 feed may be displayed to a different one of the monitors.

In another example, multiple camera 106 feeds may be displayed on a single monitor. In addition to the display of the frames of video, the monitoring system 124 may also display the frame sequence number of the displayed frames. If a new frame has not been received for a feed, then the last received frame and frame sequence number may continue to be displayed.

The monitoring system 124 may also send periodically round-trip-time probe data to the vehicle 102 to measure the round-trip-time between video controller and the vehicle transceiver 112. In many examples, the probe data may be designed with similar payload size as video frames to ensure an accurate result. This round-trip-time may be utilized to determine the network transmission time. The round-trip-time may also be displayed on the monitors, e.g., as a plotted line graph with time as an axis so that a user of the monitoring system 124 may monitor the change in latency.

The monitoring system 124 may also measure a time delta between consecutive sequence number frames of each camera 106 feed. For example, if the camera 106 captures the frames in 30 fps, then the time delta between two consecutive sequence number frames should be approximately 33 milliseconds. More generally, the delay between frames of N frames per second is 1/N seconds.

Figure 2:
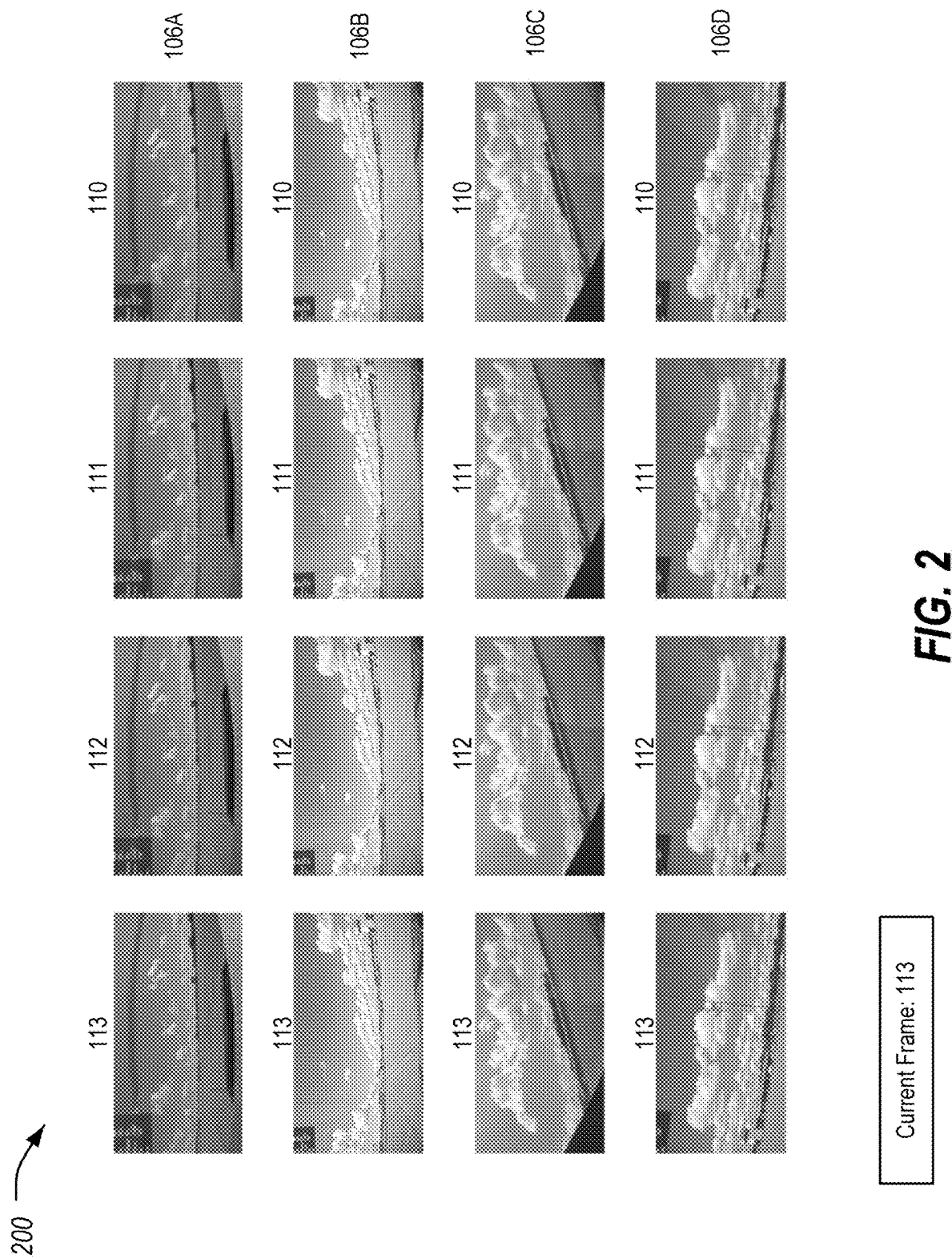
FIG. 2 illustrates an example of frames of the video stream being received in a normal transmission situation.

FIG. 2 illustrates an example 200 of frames of the video stream 114 being received in a normal transmission situation. As shown, four camera feeds are being received to the monitoring system 124. The last four updates for each of the camera feeds are also shown, with the most recent at the left and the oldest at the right. The current frame number is also shown for sake of illustration. In this example, it can be seen each of the four feeds is refreshing synchronously and each of the feeds is also up to date.

The monitoring system 124 may be configured to concurrently display the frames of an update onto the one or more monitors of the monitoring system 124. For example, initially the monitoring system 124 may show frame 110 from camera 106A, frame 110 from camera 106B, frame 110 from camera 106C, and frame 110 from camera 106D. Responsive to receiving an update to the frames, the monitoring system 124 may show frame 111 from camera 106A, frame 111 from camera 106B, frame 111 from camera 106C, and frame 111 from camera 106D. Responsive to receiving a second update to the frames, the monitoring system 124 may show frame 112 from camera 106A, frame 112 from camera 106B, frame 112 from camera 106C, and frame 112 from camera 106D. Responsive to receiving yet a further update to the frames, the monitoring system 124 may show frame 113 from camera 106A, frame 113 from camera 106B, frame 113 from camera 106C, and frame 113 from camera 106D. Such a process may continue while the video stream 114 is active and being received.

Figure 3:
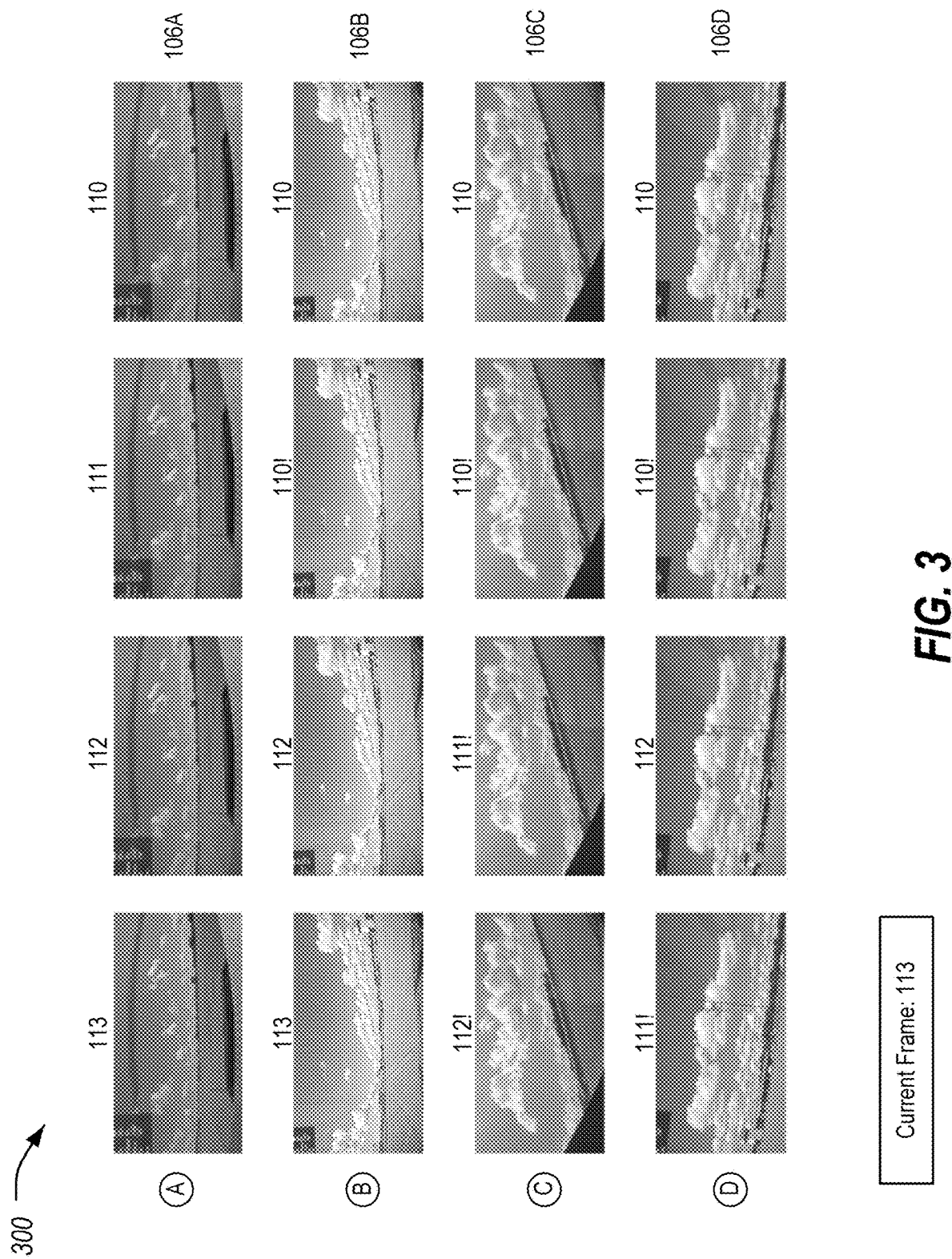
FIG. 3 illustrates an example of different scenarios that may occur with the reception of the video stream.

FIG. 3 illustrates an example 300 of different scenarios that may occur with the reception of the video stream 114. As shown in scenario (A), in a normal state, the monitoring system 124 receives all the frames from camera 106A sequentially at 30 frames per second, and the time delta between two consecutive sequence numbers frames is 33 milliseconds for each video (e.g., a delay of one frame in 30 fps video corresponds to ⅓₀th of a second or to 33.3 milliseconds of latency). Thus, for the camera 106A, the monitoring system 124 displays frame 110, receives and displays frame 111, receives and displays frame 112, and receives and displays frame 113.

As shown in scenario (B) an abnormal condition is shown with a missed frame. Specifically, in the example frame 111 is missing. In such a scenario, the monitoring system 124 may display the old frame 110 longer while other monitors in the monitoring system 124 may have updated to display new frames such as frame 111. The monitoring system 124 may detect the unsynchronized frame sequence number condition between the camera 106 feeds and may indicate an alert that the old frame 110 is still being displayed on the monitor for the camera 106 with a missed frame. This allows a user of the monitoring system 124 to be aware that the data is not as up to date from that one view as compared to the other views.

Thus, as more specifically shown for the camera 106B, the monitoring system 124 displays frame 110. A refresh of the video feed 114 is received without a frame 111 corresponding to the camera 106B. Thus, the monitoring system 124 continues to display frame 110 with an indication that the frame is old (here shown as an exclamation point with respect to the frame number of the old frame). Responsive to receiving a next refresh, a frame 112 is included so the monitoring system 124 displays frame 112, removing the indication of an old frame as the frame is again current. Similarly, responsive to receiving a further refresh, a frame 113 is included so the monitoring system 124 displays frame 113.

As shown in scenario (C), an abnormal condition is shown with delayed frames. Specifically, in the example frames 110 and 111 are displayed with delay. In such a scenario, the monitoring system 124 may first continue to display the old frame 110. Then, the monitoring system 124 may receive the frame 111, and may detect a time delta between frames 110 and 111 being greater than the expected difference between frames for the frame rate of the feed (e.g., in this example greater than 33 milliseconds). The monitoring system 124 may provide an alert on the monitor displaying the delayed feed to indicate the delayed frame.

Thus, as more specifically shown for the camera 106C, the monitoring system 124 displays frame 110. A refresh of the video feed 114 is received without a frame 111 corresponding to the camera 106B. Thus, the monitoring system 124 continues to display frame 110 with an indication that the frame is old (here shown as an exclamation point with respect to the frame number of the old frame). Responsive to receiving a next refresh, frame 111 is now included, so the monitoring system 124 displays frame 111. However, the current frame number is now 112, so frame 111 is more recent but still old, so the monitoring system 124 continues to display the indication that the frame is old. Similarly, responsive to receiving a further refresh, a frame 112 is included so the monitoring system 124 displays frame 112, again with the indication that the frame is old as the current frame number is now 113. In other words, in the situation of scenario (C) with camera 106C, the video feed 114 continues to provide updated frames but the frames are behind the frames of other cameras 106 of the system 100 so an indication is made in the monitors to indicate the feed is behind other feeds.

As shown in scenario (D), an abnormal condition is shown with an out-of-order frame. As shown, after displaying frame 112 in correct sequence, the monitoring system 124 receives frame 111 which was previously missed. In such a situation, frame 111 may be referred to as a stale frame. The monitoring system 124 may abandon frame 111 without forwarding to the monitor.

Thus, as more specifically shown for the camera 106D, the monitoring system 124 displays frame 110. A refresh of the video feed 114 is received without a frame 111 corresponding to the camera 106B. Thus, the monitoring system 124 continues to display frame 110 with an indication that the frame is old. Responsive to receiving a next refresh, frame 112 is included so the monitoring system 124 displays frame 112. The current frame number is now 112, so the monitoring system 124 removed the indication that the frame is old. However, responsive to receiving a further refresh, old frame 111 is now included. As frame 111 is older than the currently displayed frame, the monitoring system 124 continues to display frame 112 and does not update to the older frame 111, again with the indication that the frame is old. In other words, in the situation of scenario (D) with camera 106D, the video feed 114 received a frame out of order, but displays the most up to date possible frame for that feed.

It should be noted that the scenarios of FIG. 3 are example alternatives. These scenarios may occur for a single camera feed, for multiple camera feeds, or different camera feeds in various combinations over time.

Figure 4:
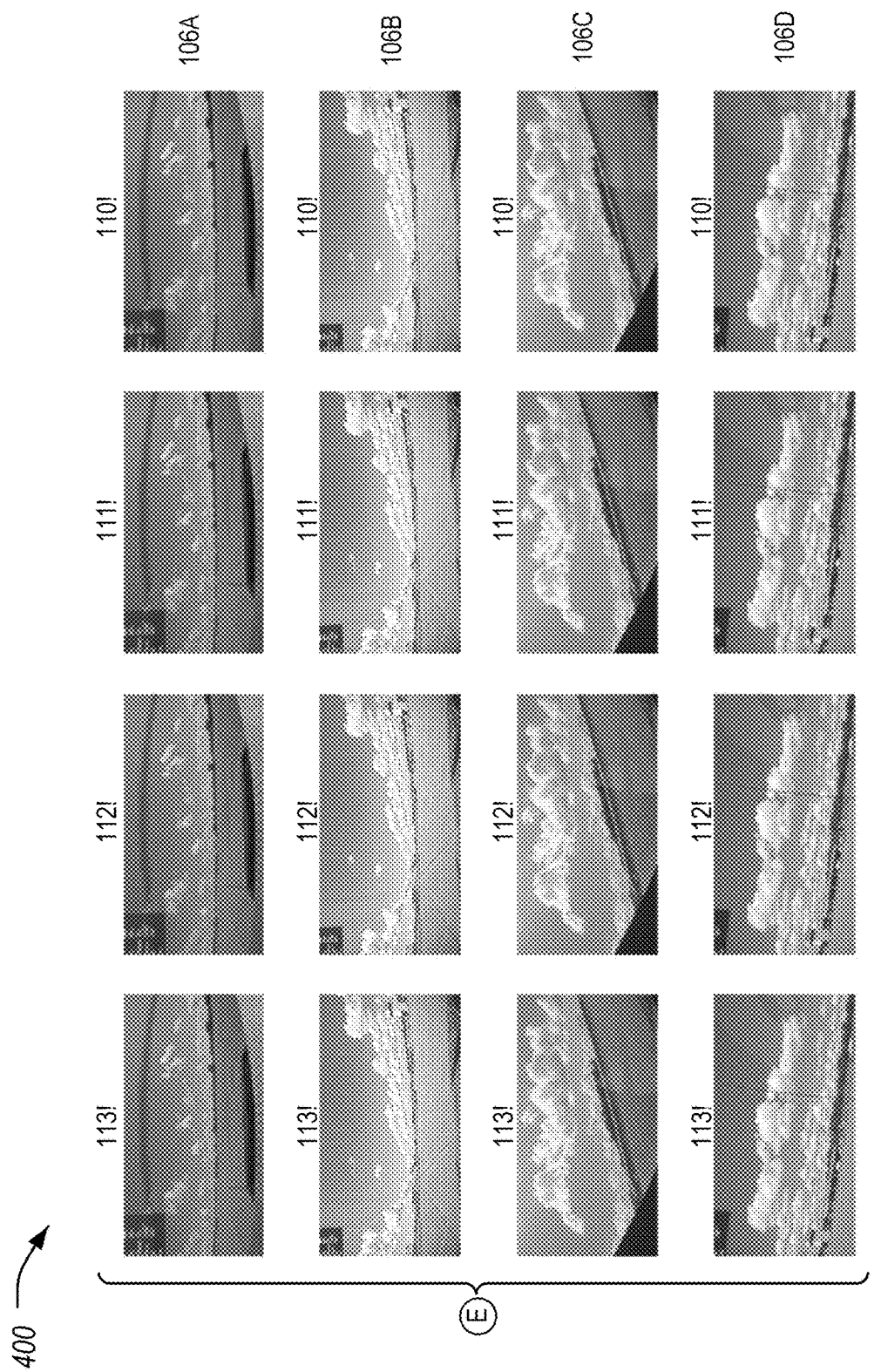
FIG. 4 illustrates an example of an increased round-trip-time scenario that may occur with the reception of the video stream.

FIG. 4 illustrates an example 400 of an increased round-trip-time scenario that may occur with the reception of the video stream 114. As shown, each of the feeds display synchronized videos, but with much longer delay than expected. This can be detected when the monitoring system 124 measures abnormally long round-trip-time between the monitoring system 124 and the vehicle 102. In such a situation, network latency has increase abnormally. This network latency affects all the video frames. As these frames are probably aged, they may be unreliable and should not be used. Thus, the monitoring system 124 may alert of a possible aged frames issue on all monitors.

More specifically, as shown the monitoring system 124 may show frame 110 from camera 106A, frame 110 from camera 106B, frame 110 from camera 106C, and frame 110 from camera 106D. However, these frames are marked as old in the monitors because at this point the current frame number is 150. Responsive to receiving an update to the frames, the monitoring system 124 may show frame 111 from camera 106A, frame 111 from camera 106B, frame 111 from camera 106C, and frame 111 from camera 106D. However, these frames are marked as old in the monitors because at this point the current frame number is 151. Responsive to receiving a second update to the frames, the monitoring system 124 may show frame 112 from camera 106A, frame 112 from camera 106B, frame 112 from camera 106C, and frame 112 from camera 106D. However, these frames are marked as old in the monitors because at this point the current frame number is 152. Responsive to receiving yet a further update to the frames, the monitoring system 124 may show frame 113 from camera 106A, frame 113 from camera 106B, frame 113 from camera 106C, and frame 113 from camera 106D. However, these frames are marked as old in the monitors because at this point the current frame number is 153.

Figure 5:
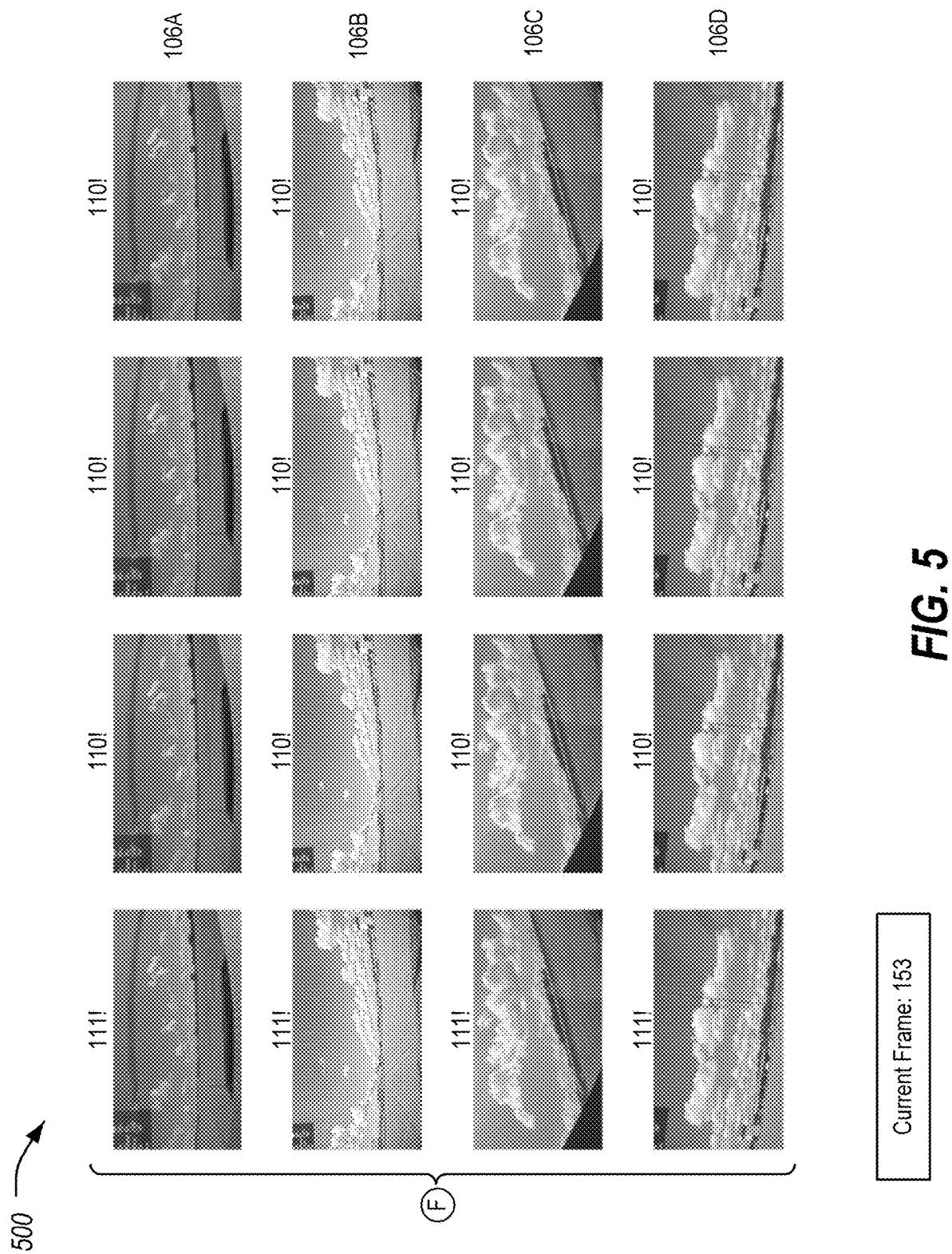
FIG. 5 illustrates an example of an increased round-trip-time scenario and delayed frames that may occur with the reception of the video stream.

FIG. 5 illustrates an example 500 of an increased round-trip-time scenario and delayed frames that may occur with the reception of the video stream 114. As shown, each of the feeds display synchronized videos, but with much longer delay than expected. Additionally, the time delay for the frames is greater than the delay between frames for the frame rate. Thus, the monitoring system 124 may alert on the monitor indicating the delayed frames.

Responsive to the monitoring system 124 identifying abnormal frames, such as those discussed above, the monitoring system 124 may take one or more actions. These actions may include to slow down or to stop the vehicle 102. Once stopped, video data bandwidth usage in the network 116 may be reduced. Responsive to network conditions improving, the monitoring system 124 may again allow for the remote system to operate. In addition, the monitoring system 124 may be configured to send a reset command to the vehicle 102 to cause the vehicle 102 to reset all frame sequence numbers to a same sequence numbers for synchronization purposes. Responsive to receipt of the rest command from the sequence numbers, the camera controller 107 may abandons all video frames in its buffer and transmits new frames with a reset sequence number. Accordingly, a user of the monitoring system 124 such as a remote driver may be alerted of abnormal videos and may take action to re-synchronize the video feeds.

Various approaches may be used for the delivery of the video stream 114 to the monitoring system 124. In many examples discussed herein, the cameras 106 may be streamed separately, and parameters of the streams such as resolution may be changed individually. In such cases, the monitoring system 124 may track individual delays for each frame within each stream. In this separate stream scenario, stale frames may be dropped if they arrive after any future frame from same camera 106 source. The vehicle 102 side may simply number each frame in sequence/timestamp to achieve this. With respect to intra-camera latency, for each camera 106, the monitoring system 124 may capture timestamps when each frame arrives and may compute delay by differencing with the time of last successful frame (two consecutive frames based on their sequence numbers). If delay for current frame exceeds a predefined threshold, a notification may be generated to indicate the latent or a latency-mitigating solution may be employed such as attempting to lower feed resolution by sending a command to the vehicle 102. With respect to inter-camera latency, the monitoring system 124 may track individual delays for each frame for each camera 106. Assuming a four camera 106 setup (although examples with more or fewer cameras 106 are possible), a minimum delay may be determined as the first camera 106 stream to provide the latest frame (e.g., the highest sequence num), as min(d1, d2, d3, d4), where d1 is a delay of a first of the cameras 106, d2 is a delay of a second of the cameras 106, d3 is a delay of a third of the cameras 106, and d4 is a delay of a fourth of the cameras 106. The average delay may be determined as (d1+d2+d3+d4)/4. The maximum delay may be the last camera 106 stream to deliver latest frame and may be determined as Max(d1, d2, d3, d4). The monitoring system 124 may display one or more of the minimum delay, the maximum delay, and/or the average delay of the feeds. Using such an approach, each camera 106 frame stream may be transmitted and displayed independently. This may mean that streams may appear faster than other streams. Thus, a remote driver operating at the monitoring system 124 may see the stream as soon as possible. It also helps to diagnose monitor offset problems or camera setting problems if a monitor always displays a frame late than others. Moreover, by having information available with respect to the delay, the remote driver may be able to understand which video feeds are more recent and therefore more reliable to use.

In another example, feeds from multiple cameras 106 may be combined and streamed as a single connection. This approach eliminates latency/jitter variation across cameras 106 but comes at other costs. Overall delay/jitter may still remain a problem, as does time-synchronization between vehicle clock and the monitoring system 124. The camera controller 107 may combines the frames of each camera 106 together into a single mega-frame and may assign a sequence number for the mega-frame only. In such a variation, the monitoring system 124 may retrieve each frame from the mega-frame to each monitor. In this way, all the frames at the monitors will always be synchronized. In such an example, stale frames may still be dropped but this affects the entire stream, as this stale frame contains multiple frames from all cameras 106 together. Also in such an approach the monitoring system 124 captures timestamp when each frame arrives, and computes delay by differencing with the time of last successful frame for a single stream. Such an approach would always have synchronized frames, but may not be as able to provide up-to-date data as one stream couldn't appear sooner.

Figure 6:
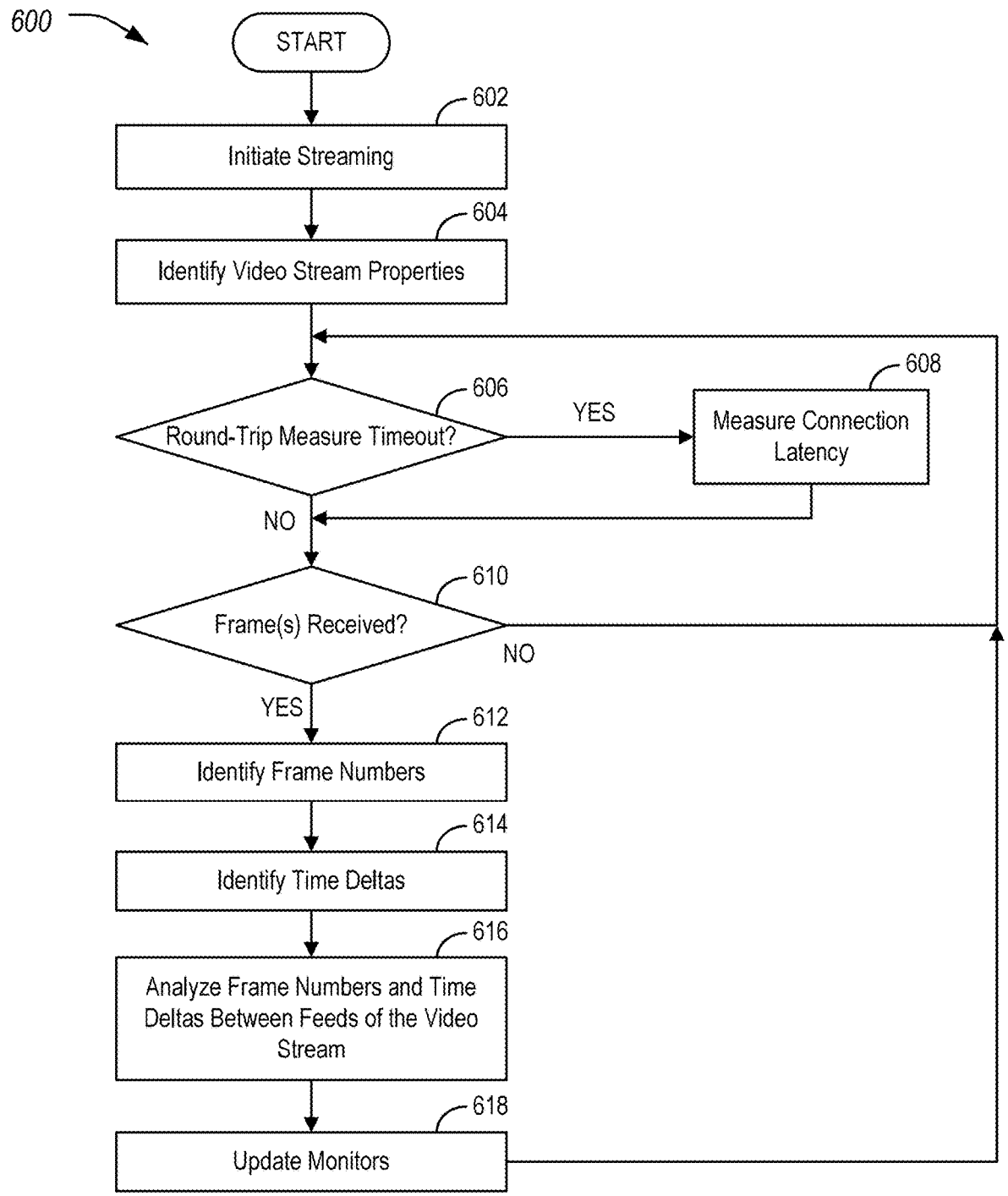
FIG. 6 illustrates an example process for performing video streaming anomaly detection for improved remote driving.

FIG. 6 illustrates an example process 600 for performing video streaming anomaly detection for improved remote driving. The process 600 may be performed, for example, by the monitoring system 124 in the context of the system 100 discussed in detail above.

At operation 602, streaming to the monitoring system 124 from the vehicle 102 is initiated. In an example, the streaming may be initiated responsive to an operator of the monitoring system 124 causing the monitoring system 124 to send a command over the network 116 to the vehicle 102 to cause the vehicle 102 to begin sending video feeds from the cameras 106 of the vehicle 102 to the monitoring system 124. In another example, the streaming may be initiated by the vehicle 102 sending a command requesting for the vehicle 102 video feeds to be monitored by the monitoring system 124.

At operation 604, the monitoring system 124 identifies properties of the video stream 114. For instance, the monitoring system 124 may identify one or more of the quantity of video feeds in the video stream 114, the resolution of each of the video feeds in the video stream 114, and/or the frame rates of each of the video feeds of the video stream 114. In some examples, one or more aspects of the video stream 114 may be provided in metadata sent with the video stream 114. In some examples, one or more aspects of the video stream 114 may be inferred from analysis of the video stream 114 by the monitoring system 124.

At operation 606, the monitoring system 124 determines whether a round-trip measure timeout has elapsed. For instance, the monitoring system 124 may periodically check the latency between the monitoring system 124 and the vehicle 102. This checking may occur for example, every second, every ten seconds, every minute, etc. If the timeout has elapsed, control passes to operation 608 to measure the connection latency. For instance, the monitoring system 124 may send round-trip-time probe data to the vehicle 102 to measure the round-trip-time where the probe data may be designed with similar payload size as video frames to ensure an accurate result. This round-trip-time may be utilized to determine the network transmission time. After operation 608, or if no timeout was reached at operation 606, control passes to operation 610.

At operation 610, the monitoring system 124 determined whether additional frames have been received for the video stream 114. For instance, the monitoring system 124 may determine whether new frames are received from over the network 116 and are waiting to be unbuffered for analysis. If not, control returns to operation 606. If so, control continues to operation 612.

At operation 612, the monitoring system 124 checks the frame numbers of the received frames of the video stream 114. For instance, the frames may include sequence numbers that increase for each consecutive frame within a video feed of the video stream 114. If the frame number of a received frame for a feed is the next incremented number from the next most recently received frame, then the frame may be indicated as a normal frame. If the frame number of a received frame is out of sequence, then the frame may be indicated as an invalid frame. For instance, if the frame number is less than that of the most recently received frame, then the frame number may be a stale frame that was received out of order.

At operation 614, the monitoring system 124 checks the time delta between the received frames of the video stream 114 and the next most recently received frames of the video stream 114. For instance, timestamp information with respect to receipt of the frames may be analyzed to determine the time differential between receipt of the current frame and the receipt of the prior frame. The frame rate of the video feed as identified at operation 604 may be used to determine the correct interval in time between frames. For instance, for 30 fps, the feed should have a new frame approximately every 33 milliseconds.

At operation 616, the monitoring system 124 analyses frame numbers and time deltas between the video feeds of the video stream 114. In an example, the monitoring system 124 may compare the current frame numbers across the video feeds and may note any video feeds that are increasing behind in sequence number to other video feeds of the video stream 114. In another example, the monitoring system 124 may compare the current frame numbers and may note whether some or all of the streams are not increasing in sequence number. The monitoring system 124 may also check to see if time deltas for frames are large beyond the expected delta for the framerate, as this may be an indication of network congestion and this may imply that many of the received frames are aged.

At operation 618, the monitoring system 124 updates the monitors. For instance, for any feeds that have received a new frame with a higher sequence number, that new frame is displayed, for any feeds that have not received a new frame, the existing frame is displayed with an indication that the frame is older than current, and for any feeds that have received a new frame with a lower sequence number, that new frame is discarded. In some examples, the sequence numbers themselves may also be displayed. In some examples, the current frame number that should be shown based on the frame rate of the video feeds of the video stream 114 is also displayed. In some examples, the round-trip-time may also be displayed on the monitors, e.g., as a plotted line graph with time as an axis so that a user of the monitoring system 124 may monitor the change in latency. After operation 618, control returns to operation 606.

Variations on the disclosed systems and methods are possible. For example, the approaches discussed above do not require clock synchronization between the vehicles 102 and the monitoring system 124. However, in some examples, a GNSS feed at the monitoring system 124 may be used to synchronize time between the cameras 106 and the monitoring system 124. In such an example, each frame may include have both seq number and a timestamp determined via GNSS. This timestamp may also aid in the detection of aged frames.

With respect to latency mitigation solutions, as noted above the monitoring system 124 may drop stale frames. In another example, the monitoring system 124 may command the vehicle 102 to reduce video resolution to relieve such a condition. In yet a further example, the monitoring system 124 may command the vehicle 102 to adapt compression characteristics to ease the latency condition.

Figure 7:
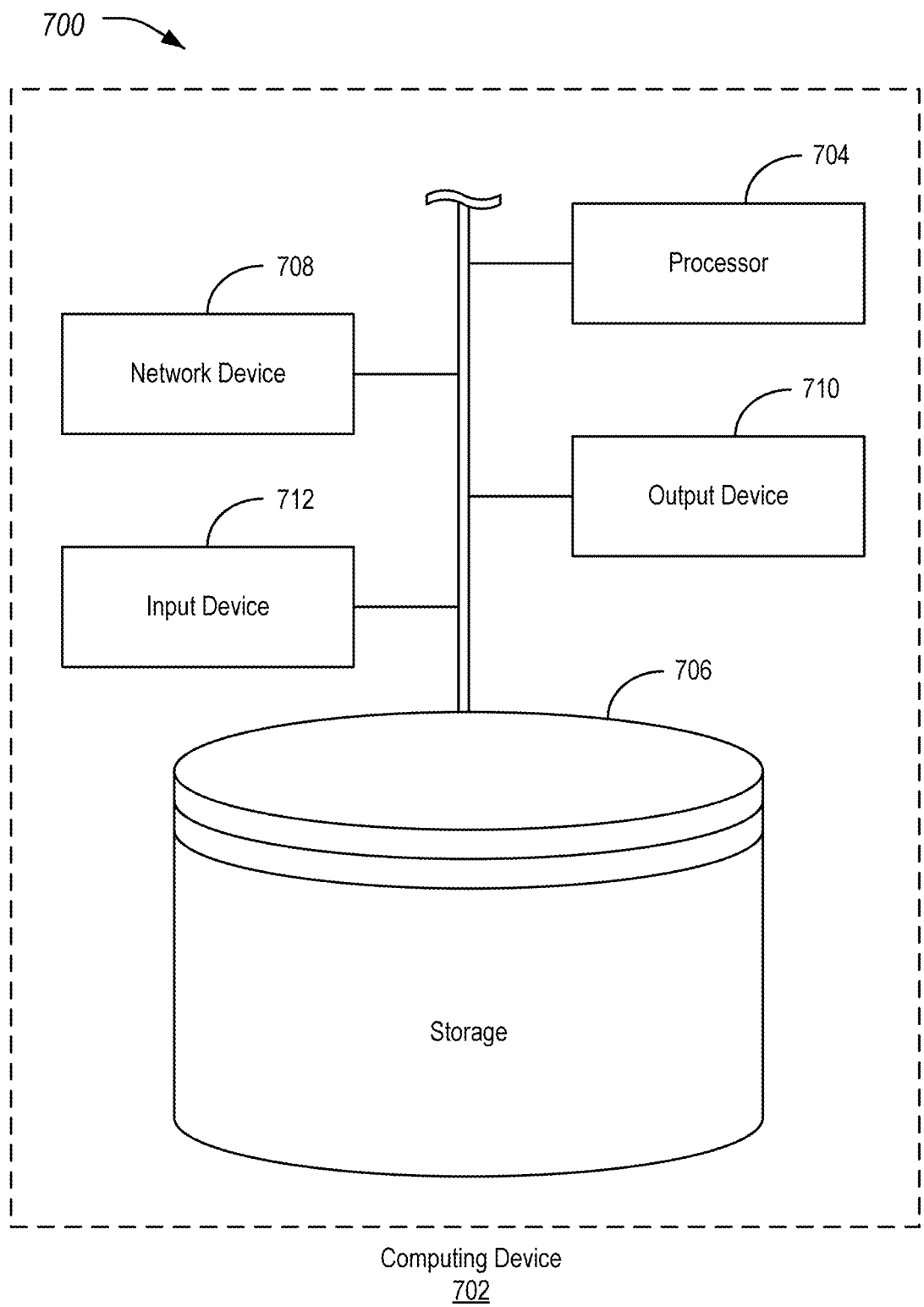
FIG. 7 illustrates example computing device for performing video streaming anomaly detection for improved remote driving.

FIG. 7 illustrates example computing device 702 for performing video streaming anomaly detection for improved remote driving. Referring to FIG. 7, and with reference to FIGS. 1-6, the controllers 104, TCU 110, and monitoring system 124 may be examples of such computing devices 702. Computing devices generally include computer-executable instructions where the instructions may be executable by one or more computing devices 702. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

As shown, the computing device 702 may include a processor 704 that is operatively connected to a storage 706, a network device 708, an output device 710, and an input device 712. It should be noted that this is merely an example, and computing devices 702 with more, fewer, or different components may be used.

The processor 704 may include one or more integrated circuits that implement the functionality of a central processing unit (CPU) and/or graphics processing unit (GPU). In some examples, the processors 704 are a system on a chip (SoC) that integrates the functionality of the CPU and GPU. The SoC may optionally include other components such as, for example, the storage 706 and the network device 708 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 704 executes stored program instructions that are retrieved from the storage 706. The stored program instructions, accordingly, include software that controls the operation of the processors 704 to perform the operations described herein. The storage 706 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 710. The output device 710 may include a graphical or visual display device, such as an electronic display screen, projector, printer, or any other suitable device that reproduces a graphical display. As another example, the output device 710 may include an audio device, such as a loudspeaker or headphone. As yet a further example, the output device 710 may include a tactile device, such as a mechanically raiseable device that may, in an example, be configured to display braille or another physical output that may be touched to provide information to a user.

The input device 712 may include any of various devices that enable the computing device 702 to receive control input from users. Examples of suitable input devices that receive human interface inputs may include keyboards, mice, trackballs, touchscreens, voice input devices, graphics tablets, and the like.

The network devices 708 may each include any of various devices that enable the described components to send and/or receive data from external devices over networks (such as the communications network 116). Examples of suitable network devices 708 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for monitoring a vehicle, comprising:
a monitoring system having one or more monitors, the monitoring system configured to communicate with a vehicle over a network and programmed to
receive a plurality of video feeds captured from cameras of the vehicle, each of the plurality of video feeds including a plurality of frames, each of the frames of each of the video feeds being assigned a sequence number that increases for each successive frame;
analyze the sequence numbers to identify missing frames, delayed frames, or stale frames;
display, to the one or more monitors, the plurality of video feeds, the sequence numbers corresponding to the displayed frames, and for each of the plurality of video feeds, indications of whether any missed frames, delayed frames, or stale frames were identified, wherein a stale frame is a frame with a lower frame number than another previously received frame for the same video feed;
receive remote driving commands from an operator of the monitoring system based on the indications of whether any missed frames, delayed frames, or stale frames were identified; and
send the remote driving commands from the monitoring system to the vehicle.

2. The system of claim 1, wherein the monitoring system is further programmed to:
identify a corresponding frame rate for each of the plurality of video feeds;
determine time deltas between successive frames for each of the plurality of video feeds; and
indicate in the one or more monitors which, if any, of the plurality of video feeds have time deltas at least a predefined threshold amount of time in excess of a time difference between frames as defined by the corresponding frame rate.

3. The system of claim 1, wherein the monitoring system is further programmed to:
periodically measure connection latency between the monitoring system and the vehicle; and
display a graph of the connection latency between the monitoring system and the vehicle to the one or more monitors.

4. The system of claim 3, wherein the monitoring system is further programmed to, responsive to determining connection latency exceeds a predefined threshold, send a command to the vehicle to perform operations including one or more of to lower a resolution of one or more of the plurality of video feeds or to perform compression on one or more of the plurality of video feeds.

5. The system of claim 1, wherein the monitoring system is further programmed to identify a quantity of streams and frame rates for each of the plurality of video feeds from metadata transmitted with the plurality of video feeds.

6. The system of claim 1, wherein the monitoring system is further programmed to send a synchronize command to the vehicle to cause the vehicle to reset the sequence numbers for each of the plurality of video feeds to an initial value.

7. A method for monitoring a vehicle, comprising:
receiving, to a monitoring system over a network from a vehicle, a plurality of video feeds captured from cameras of the vehicle, each of the plurality of video feeds including a plurality of frames, each of the frames of each of the video feeds being assigned a sequence number that increases for each successive frame;
analyzing, by the monitoring system, the sequence numbers to identify missing frames, delayed frames, or stale frames;
displaying, to one or more monitors of the monitoring system, the plurality of video feeds, the sequence numbers corresponding to the displayed frames, and for each of the plurality of video feeds, indications of whether any missed frames, delayed frames, or stale frames were identified, wherein a stale frame is a frame with a lower frame number than another previously received frame for the same video feed;
receiving remote driving commands from an operator of the monitoring system based on the indications of whether any missed frames, delayed frames, or stale frames were identified; and
sending the remote driving commands from the monitoring system to the vehicle.

8. The method of claim 7, further comprising:
identifying a corresponding frame rate for each of the plurality of video feeds;
determining time deltas between successive frames for each of the plurality of video feeds; and
indicating in the one or more monitors which, if any, of the plurality of video feeds have time deltas at least a predefined threshold amount of time in excess of a time difference between frames as defined by the corresponding frame rate.

9. The method of claim 7, further comprising:
periodically measuring connection latency between the monitoring system and the vehicle; and
displaying a graph of the connection latency between the monitoring system and the vehicle to the one or more monitors.

10. The method of claim 9, further comprising, responsive to determining connection latency exceeds a predefined threshold, sending a command to the vehicle to perform operations including one or more to lower a resolution of one or more of the plurality of video feeds or to perform compression on one or more of the plurality of video feeds.

11. The method of claim 7, further comprising identifying a quantity of streams and frame rates for each of the plurality of video feeds from metadata transmitted with the plurality of video feeds.

12. The method of claim 7, further comprising sending a synchronize command to the vehicle to cause the vehicle to reset the sequence numbers for each of the plurality of video feeds to an initial value.

13. A non-transitory computer-readable medium comprising instructions that, when executed by one or more processors of a monitoring system, cause the monitoring system to perform operations including to:
receive, over a network from a vehicle, a plurality of video feeds captured from cameras of the vehicle, each of the plurality of video feeds including a plurality of frames, each of the frames of each of the video feeds being assigned a sequence number that increases for each successive frame;

analyze the sequence numbers to identify missing frames, delayed frames, or stale frames;

display, to one or more monitors for use by an operator of the monitoring system, the plurality of video feeds, the sequence numbers corresponding to the displayed frames, and for each of the plurality of video feeds, indications of whether any missed frames, delayed frames, or stale frames were identified, wherein a stale frame is a frame with a lower frame number than another previously received frame for the same video feed;

receive remote driving commands from an operator of the monitoring system based on the indications of whether any missed frames, delayed frames, or stale frames were identified; and send the remote driving commands from the monitoring system to the vehicle.

14. The medium of claim 13, further comprising instructions that, when executed by the one or more processors of the monitoring system, cause the monitoring system to perform operations including to:

identify a corresponding frame rate for each of the plurality of video feeds;

determine time deltas between successive frames for each of the plurality of video feeds; and indicate in the one or more monitors which, if any, of the plurality of video feeds have time deltas at least a predefined threshold amount of time in excess of a time difference between frames as defined by the corresponding frame rate.

15. The medium of claim 13, further comprising instructions that, when executed by the one or more processors of the monitoring system, cause the monitoring system to perform operations including to:

periodically measure connection latency between the monitoring system and the vehicle; and display a graph of the connection latency between the monitoring system and the vehicle to the one or more monitors.

16. The medium of claim 15, further comprising instructions that, when executed by the one or more processors of the monitoring system, cause the monitoring system to perform operations including to responsive to determining connection latency exceeds a predefined threshold, send a command to the vehicle to perform operations including one or more of to lower a resolution of one or more of the plurality of video feeds or to perform compression on one or more of the plurality of video feeds.

* * * * *